United States Patent [19]

Englot et al.

[11] Patent Number: 4,903,178
[45] Date of Patent: Feb. 20, 1990

[54] RECHARGEABLE FLASHLIGHT

[75] Inventors: Barry Englot, Box 32, Abernethy, Saskatchewan S0A 0A0; Orville Olm, Saskatoon, both of Canada

[73] Assignee: Barry Englot, Abernethy, Canada

[21] Appl. No.: 305,061

[22] Filed: Feb. 2, 1989

[51] Int. Cl.⁴ .............................................. F21L 9/00
[52] U.S. Cl. .................................... 362/183; 362/199
[58] Field of Search ............... 362/183, 194, 196, 199, 362/200, 203, 204

[56] References Cited

U.S. PATENT DOCUMENTS

| | | | |
|---|---|---|---|
| 1,469,783 | 9/1923 | Essington | 30/162 |
| 2,410,527 | 11/1946 | Schinske | 320/2 |
| 2,582,330 | 1/1952 | Hautala | 240/10.6 |
| 2,942,103 | 6/1960 | Stillfried et al. | 362/183 |
| 2,963,573 | 12/1960 | Ziegenbein | 362/183 |
| 3,067,373 | 12/1962 | Hoft et al. | 362/183 |
| 3,109,132 | 10/1963 | Witte | 362/183 |
| 3,275,819 | 9/1966 | Laurent | 362/183 |
| 3,749,905 | 7/1973 | Friedman | 240/10.6 |
| 4,004,208 | 1/1977 | Tamminen | 320/2 |
| 4,092,580 | 5/1978 | Prinsze | 320/2 |
| 4,224,658 | 9/1980 | Siiberg | 362/183 |
| 4,325,107 | 4/1982 | MacLeod | 362/183 |
| 4,357,648 | 11/1982 | Nelson | 362/183 |
| 4,422,130 | 12/1983 | Shigeo | 362/183 |
| 4,514,790 | 4/1985 | Will | 362/183 |
| 4,535,397 | 8/1985 | May | 362/369 |
| 4,713,735 | 12/1987 | Hiltman | 362/183 |

FOREIGN PATENT DOCUMENTS

| | | | |
|---|---|---|---|
| 219146 | 1/1962 | Austria | 362/183 |
| 1070289 | 12/1959 | Fed. Rep. of Germany | 362/183 |
| 1123765 | 2/1962 | Fed. Rep. of Germany | 362/183 |
| 1127465 | 4/1962 | Fed. Rep. of Germany | 362/183 |
| 1263782 | 5/1961 | France | 362/183 |

OTHER PUBLICATIONS

Brochure by Barry Englot, "Translight", no pub. date.

*Primary Examiner*—Ira S. Lazarus
*Assistant Examiner*—Richard R. Cole
*Attorney, Agent, or Firm*—Adrian D. Battison; Stanley G. Ade; Murray E. Thrift

[57] ABSTRACT

A flashlight includes a flashlight body which is formed in two portions second of which is pivotally mounted on the first portion. A forward end of the flashlight body is generally rectangular in cross-section with a rearward end being approximately one half of the cross-section of the forward end with the second body portion being of a similar cross-sectional shape to the smaller end. In this way the second body portion can be pivoted from a position in which it constitutes an extension of the first portion as a handle therefore or can be moved to a folded position lying alongside and underneath the smaller end so that in the folded condition a continuous rectangular shape is formed. In this condition the flashlight body can be inserted into a sleeve of rectangular cross-section for storage with a charging device at the base of the sleeve having terminals for cooperation with the terminals of the second body portion for charging a battery. The only switch is provided by the connection of the terminals of the first body portion and the terminals of the second body portion when in the extended position. A magnet is provided to hold the folded flashlight in the sleeve. The device is compact in the folded and stored condition and forms a simple rugged construction of elongate form in the opened condition.

16 Claims, 4 Drawing Sheets

RECHARGEABLE FLASHLIGHT

BACKGROUND OF THE INVENTION

This invention relates to a rechargeable removable flashlight which is particularly but not exclusively designed for use in a motor vehicle which includes a charging system so that the flashlight can be maintained in a suitable receptacle within the vehicle in a properly charged condition for use whenever required.

Many different designs of portable flashlights of a rechargeable type for mounting in motor vehicles have been proposed but none have received significant commercial success despite the desirability of a device of this type. Many of the designs are of a type which can be inserted for charging into the cigarette lighter socket of the motor vehicle but this is undesirable since the charging can take a significant period of time and since the device cannot be properly stored in its condition.

Two previous designs of particular relevance are shown in U.S. Pat. Nos. 4,713,735 (Hiltman) and 4,422,130 (Shigeo).

Hiltman shows an arrangement in which a flashlight includes a peg arrangement which can be pivoted from a stored position in which the flashlight is normally used to a projecting position for insertion into the dashboard socket of the vehicle.

Shigeo shows an arrangement in which the projecting pins which are inserted into a charging system when in the charging mode are covered by a handle which is pivotally mounted on the flashlight housing when the flashlight is in the operational mode.

However none of these devices is particularly suitable for mounting in the vehicle in a compact condition for charging with the possibility of being quickly and simply moved to an operational condition which is useful for handling.

SUMMARY OF THE INVENTION

It is one object of the present invention, therefore, to provide a rechargeable flashlight device which is of simple economic construction and can be readily moved from a charging condition in which it can be stored compactly to an operating condition in which it is shaped for suitable handling with the charging terminals properly concealed and protected.

It is a second object of the present invention to provide a rechargeable flashlight which is formed in two portions which can be folded to cooperate to shape the device for insertion into a suitable charging receptacle and can be unfolded to provide a handle by which the device can be carried.

According to the first aspect of the invention there is provided a rechargeable removable flashlight comprising a flashlight body having a first body portion including a casing, a bulb and a reflector assembly mounted in the casing and arranged to generate a directional beam of light projecting outwardly from the casing, a pair of electrical terminals projecting from the casing at a position spaced from the bulb and reflector assembly and means connecting the terminals to the bulb so that a voltage connected across the terminals provides a current through the bulb for generating the beam of light; a second body portion including a casing, a rechargeable battery mounted in the casing a pair of electrical terminals projecting from the casing and means connecting the terminals to the battery, and means mounting the second body portion on the first body for movement from a first position in which electrical terminals of the second body portion are exposed for engaging terminals of a charging device and a second position in which the terminals of the second body portion contact the terminals of the first body portion for communicating current from the battery to the bulb.

According to the second aspect of the invention there is provided a rechargable removable flashlight comprising a flashlight body and a housing for receiving and retaining the flashlight body in a stored condition for recharging, the housing comprising a sleeve member of substantially constant cross section having a closed end and an open end into which the flashlight body can be inserted, the flashlight body having a first body portion including a casing, a bulb and reflector assembly for generating a beam of light projecting from the casing along a longitudinal axis of the casing, a rechargable battery in the flashlight body for providing current to the bulb, a second body portion and means mounting the second body portion on the first body portion for pivotal movement about an axis transverse to the longitudinal axis of the first body portion for a first position in which the second body portion projects from the first body portion along the axis away from the bulb and reflector assembly to define a handle part and a second position in which the second body portion cooperates with the first body portion to define an end face of the body remote from the bulb and reflector assembly which corresponds in shape to the cross section of the sleeve member.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
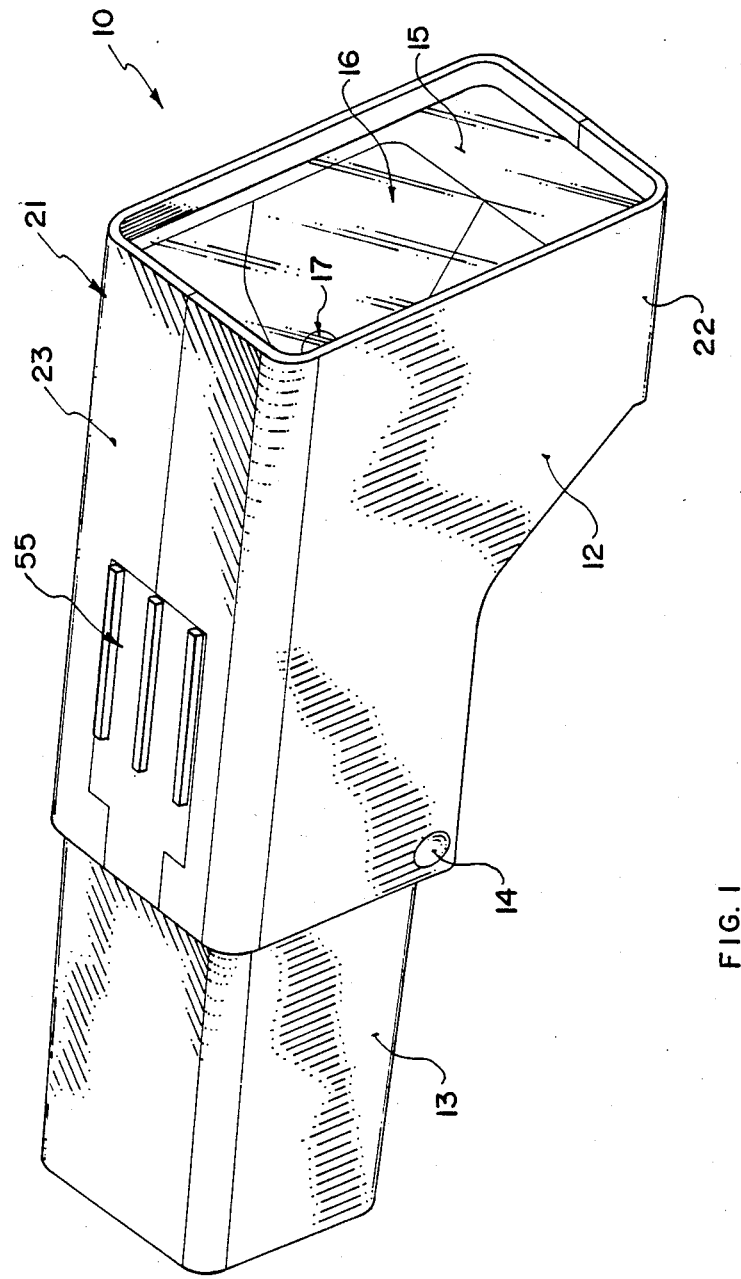
FIG. 1 is an isometric view of the flashlight according to the invention in an erected or operational condition, the view being taken from a forward end and one side of the flashlight.
Figure 2:
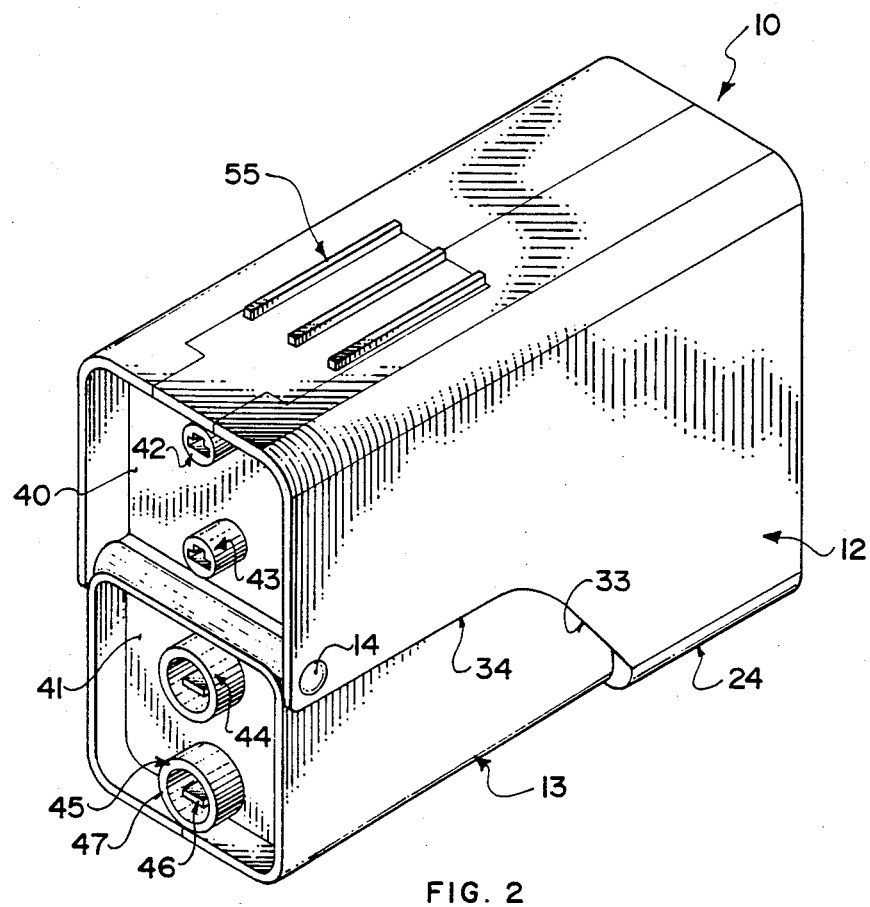
FIG. 2 is an isometric view of the flashlight of FIG. 1 in a folded condition with the view being taken from the rear ad the same side as that of FIG. 1.
Figure 4:
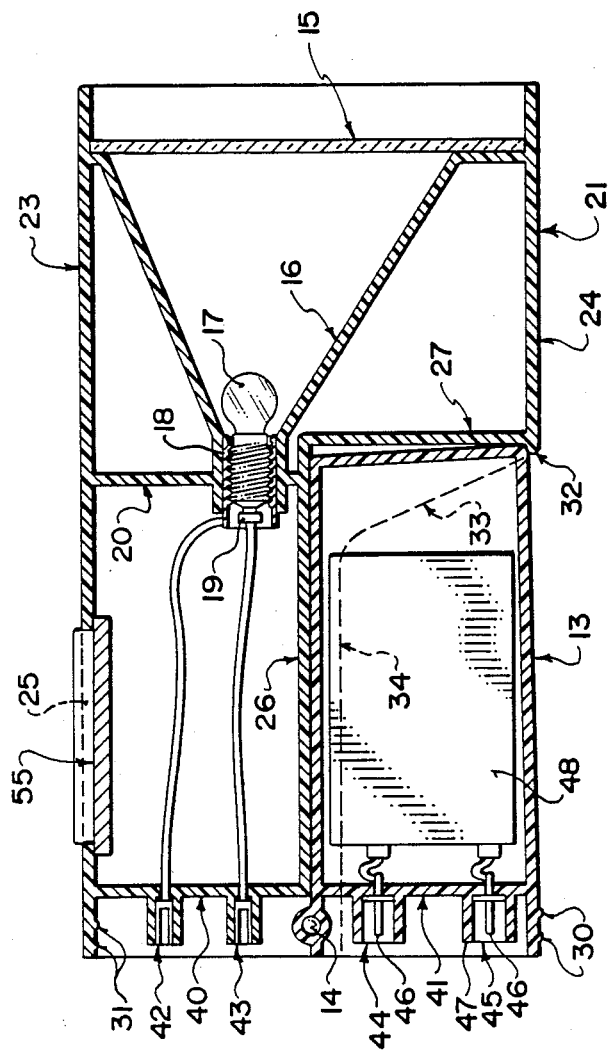
FIG. 4 is a longitudinal cross-sectional view of the flashlight in the folded condition of FIG. 2.

The flashlight of the invention comprises a flashlight portion generally indicated at 10 which is shown in most detail in FIGS. 1, 2 and 4 together with a receptacle 11 into which the flashlight can be inserted for storage and charging purposes.

Turning firstly to the construction of the flashlight portion 10, the flashlight includes a body which is formed in two portions 12 and 13 which are pivotally connected by a transverse pin 14. The first portion 12 has a front end face which is substantially of rectangular cross-section including a glass 15, a reflector 16 and a bulb 17. As shown in FIG. 4 the bulb is attached in conventional manner into a screw threaded sleeve 18 by which electrical connection is made to the bulb along a side contact and an end contact 19. The sleeve 18 is supported by a bracket 20 shown schematically. The details of the bulb and reflector assembly are shown only schematically since these are conventional in nature and can be redesigned in accordance with particular requirements.

The bulb and reflector assembly is mounted within a casing 21 which defines a first sleeve part 22 which is substantially rectangular in cross-section following the rectangular end face of the flashlight. The first part 22 extends along the length of the first portion of the body to an extent approximately one quarter along the full length thereof thus providing sufficient area to receive the reflector 16. A second part of the first body portion extends from the other end of the first body portion and has a cross-section which is approximately one half of the cross-section of the first part so that the first portion reduces in height to approximately half the height. Thus as best shown in FIG. 4, the first part 22 includes an upper wall 23 and a lower wall 24. The upper wall 23 continues into the second part 25 of the first body portion substantially in a straight line. Similarly the sidewalls are continuous along the length of the first body portion. However an underside wall 26 of the second part extends along the first body portion at approximately a position halfway between the upper wall 23 and the lower wall 24 and then turns downwardly as indicated at the part 27 to connect with the lower wall 24 and thus to define the first part of the first body portion.

The second body portion 13 includes a substantially rectangular cross-section substantially equal to that of the second part of the first body portion as best shown in FIG. 2. The pivot pin 14 enables the second body portion to pivot about the pivot pin to take up the position shown in FIG. 1 in which the second body portion 13 constitutes an extension of the second part of the first body portion of substantially the same cross-section as that second part and can move to the position shown in FIG. 2 in which the second body portion is folded underneath the second part of the first body portion so that the whole unit is substantially of the cross-section of the first part of the first body portion.

As shown in FIG. 4, the undersurface of the second body portion includes projections 30 which cooperate with projections 31 on the underside of a flange projecting rearwardly from the first body portion on the underside of the upper wall 23 so that the second body portion can be latched into position in the extended position shown in FIG. 1. In addition the second body portion can be latched into the position shown in FIGS. 2 and 4 by cooperation between a lower most edge of the second body portion and a flange 32 which is an extension of the lower wall 24. For purposes of a pleasing appearance, as best shown in FIGS. 2 and 4, the sidewall 33 of the first body portion extends in an inclined direction upwardly and rearwardly from the outermost end of the flange 32 to define a compartment into which the end of the second body portion is received. Similarly the sidewall 33 defines a flange 34 which projects downwardly from the lower wall 26 of the second part of the first body portion. The flange 34 receives the pivot pin 14 to maintain it attached to the first body portion and also hides the upper edge of the second body portion to provide the attractive appearance.

Each of the first and second body portions at the rear end visible in FIG. 2 comprises an end wall 40, 41 closing the hollow interior of the body portion. The end wall 40 carries a pair of terminals 42, 43 which are the type defining a surrounding metallic material with a slot shaped opening to receive a slot shaped pin of a cooperating terminal. The end wall 41 carries a pair of terminals 44, 45 which have a slot shaped pin 46 for cooperation with the terminals 42 and 43 together with a surrounding plastics protecting ring 47 which prevent the pins 46 from accidentally being distorted.

The terminals 42 and 43 are connected to the bulb 17 so that the application of voltage across the terminals causes current to flow through the bulb to generate a beam of light emitted from the end face of the first body portion through the glass 15 in a direction longitudinal of the first body portion substantially along an axis thereof.

The terminals 44 and 45 are connected to a battery 48 which is of the rechargeable type.

When the second body portion is pivoted to the position shown in FIG. 1, the pins forming the terminals 44 and 45 are inserted into the sockets forming the terminals 42 and 43 to provide a connection between the battery and the bulb so that power is supplied from the battery to the bulb to generate the beam of light. The only switching arrangement which controls the supply of power from the battery to the bulb is that provided by the contact between the terminals. In this way the light is illuminated whenever the second body portion is moved into the extended or handle position and is extinguished whenever the second body portion is moved away from that position toward or into the folded position.

Figure 3:
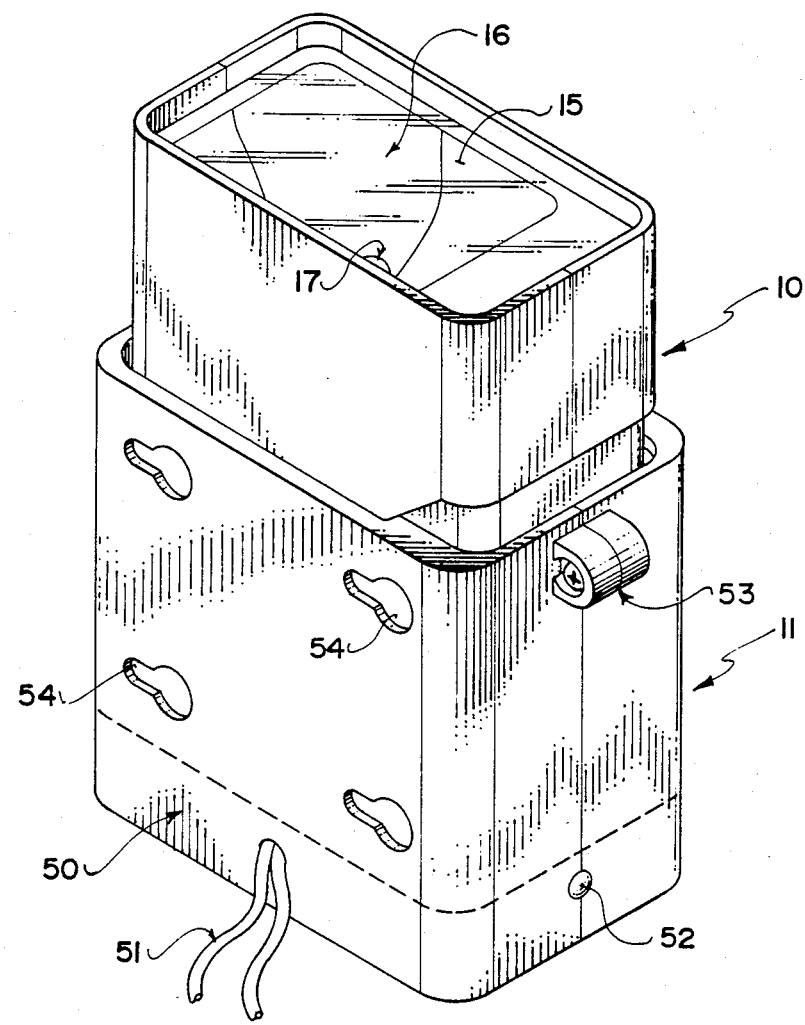
FIG. 3 is an isometric view of the flashlight in the folded condition of FIG. 2 inserted into a charging receptacle.

Turning now to FIG. 3, the receptacle for receiving and charging the flashlight when folded into the condition of FIG. 2 is indicated at 11 and comprises a sleeve member having an internal opening of a cross-section the same as that of the flashlight that is generally rectangular so that the flashlight body can be received into the sleeve of the receptacle as a sliding fit. At a lower end of the sleeve is provided a charging device generally indicated at 50 to which is connected a pair of power wires 51 for receiving voltage from the charging circuit of the vehicle to which the device is attached. The charging device 50 includes a voltage regular (not shown) and a diode 52 which indicates that power is properly supplied. In addition the charging device includes a pair of terminals similarly shaped to the terminals 42 and 43 and positioned on the base of the receptacle projecting upwardly toward the open end so as to cooperate with the terminals 44 and 45 of the second body portion for applying power to the battery during the recharging process. For convenience of manufacture the receptacle is formed in two parts clamped together by lugs 53. Suitable mounting brackets or screw openings are indicated at 54 by which the receptacle can be attached to a suitable surface of the vehicle.

To ensure that the flashlight is maintained within the receptacle without the danger of vibration causing it to escape from the confines of the receptacle, an upper surface of the second body portion includes a magnet 55 for cooperation with a suitable magnet or strip provided on the inner surface of the sleeve forming the receptacle 11. To ensure that the flashlight is inserted in the proper orientation, the sleeve and flashlight may include a cooperating lug/recess (not shown) which ensures that the terminals of the second body portion engage the terminals of the charging device at the base of the sleeve shaped receptacle.

The folding arrangement of the flashlight provides a neat attractive appearance in the folded condition combined with the compactness which enables it to be received within the simple rectangular sleeve of the receptacle. In this way the flashlight can be positioned at various convenient locations within the vehicle as required by the user.

In the expanded condition shown in FIG. 1, the flashlight takes upon the configuration of a conventional elongate flashlight which is convenient to handle and is of a rugged construction.

Furthermore the use of the terminals of the first and second body portions as the only switching technique by which the flashlight is activated enables the device to manufacture simply with a more limited number of parts and with less danger of failure of the moving parts otherwise necessary for a switch. Furthermore the absence of any other switch ensures that when in the charging mode, the flashlight cannot be accidentally left in actuated condition since, as is well known, the discharge of the battery during operation is often significantly more rapid than the charging process so that charging will not be achieved if the battery is placed in the charging mode while the flashlight is still activated.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A rechargeable removable flashlight comprising a flashlight body having a first body portion including a casing, a bulb and a reflector assembly mounted in the casing and arranged to generate a directional beam of light projecting outwardly from the casing, a pair of electrical terminals projecting from the casing at a position spaced from the bulb and reflector assembly and means connecting the terminals to the bulb so that a voltage connected across the terminals provides a current through the bulb for generating the beam of light; a second body portion including a casing, a rechargeable battery mounted in the casing a pair of electrical terminals projecting from the casing and means connecting the terminals to the battery, and means mounting the second body portion on the first body for movement from a first position in which electrical terminals of the second body portion are exposed for engaging terminals of a charging device and a second position in which the terminals of the second body portion contact the terminals of the first body portion for communicating current from the battery to the bulb.

2. The invention according to claim 1 including switch means for controlling communication of current from the battery to the bulb consisting solely of the terminals of the first and second body portions so that the bulb is activated and deactivated by said movement of the second body portion.

3. The invention according to claim 1 including a charging device defining a receptacle for receiving the flashlight body in a charging and storing position thereof, the first and second body portions in the first position being arranged such that portions of each cooperate to define a shape of an end face of the flashlight body which can be received within the receptacle.

4. The invention according to claim 3 wherein the second body portion is movable from said first position to the second position in which it extends beyond the first body portion to define with the first body portion an elongate handle.

5. The invention according to claim 1 wherein the second body portion is pivotally mounted on the body portion for pivotal movement through an angle substantially equal to 180°.

6. The invention according to claim 5 wherein the first body portion includes a longitudinal axis extending in a direction substantially along the beam of light and wherein the pivot axis is arranged at right angles to the longitudinal axis.

7. The invention according to claim 6 wherein the first body portion includes a first part thereof adjacent the bulb and reflector assembly having a cross section in a plane transverse to the longitudinal axis and includes a second part adjacent an end thereof remote from the bulb and reflector assembly which has a cross section in a plane transverse to the longitudinal axis which is substantially one half of that of the first part and wherein the second body portion has a cross section in a plane transverse to the longitudinal axis which is substantially equal to half of the cross section of the first part so that when in the first position the second body portion lies alongside the second part of the first body portion such that the flashlight body is substantially of constant cross section and in the second position the second body portion extends outwardly from the second part of the first body portion substantially as a continuing extension thereof.

8. The invention according to claim 7 wherein the cross section of the first part is substantially rectangular.

9. The invention according to claim 7 including a housing for receiving and retaining the flashlight in a stored condition for recharging including a sleeve member having a constant cross section substantially equal to that of the first part of the first portion.

10. The invention according to claim 1 including a housing for receiving and retaining the flashlight in a stored condition for recharging wherein the flashlight body includes a magnet on a face thereof substantially parallel to the longitudinal axis thereof for cooperating with a portion of the housing to hold the flashlight body in place within the housing.

11. A rechargable removable flashlight comprising a flashlight body and a housing for receiving and retaining the flashlight body in a stored condition for recharging, the housing comprising a sleeve member of substantially constant cross section having a closed end and an open end into which the flashlight body can be inserted, the flashlight body having a first body portion including a casing, a bulb and reflector assembly for generating a beam of light projecting from the casing along a longitudinal axis of the casing, a rechargable battery in the flashlight body for providing current to the bulb, a second body portion and means mounting the second body portion on the first body portion for pivotal movement about an axis transverse to the longitudinal axis of the first body portion for a first position in which the second body portion projects from the first body portion along the axis away from the bulb and reflector assembly to define a handle part and a second position in which the second body portion cooperates with the first body portion to define an end face of the body remote from the bulb and reflector assembly which corresponds in shape to the cross section of the sleeve member.

12. The invention according to claim 11 wherein the battery is mounted in the second body portion and wherein switch means for controlling communication of current from the battery to the bulb consists solely of a first pair of terminals on the first body portion which contact a pair of terminals on the second body portion so that the bulb is activated and deactivated by said movement of the second body portion.

13. The invention according to claim 11 wherein the second body portion is pivotally mounted on the body portion for pivotal movement through an angle substantially equal to 180°.

14. The invention according to claim 11 wherein the first body portion includes a first part thereof adjacent the bulb and reflector assembly having a cross section in a plane transverse to the longitudinal axis and includes a second part adjacent an end thereof remote from the bulb and reflector assembly which has a cross section in a plane transverse to the longitudinal axis which is substantially one half of that of the first portion and wherein the second body portion has a cross section in a plane at right angles to the longitudinal axis which is substantially equal to half of the cross section of the first part so that when in the first position the second body portion lies alongside the second part of the first body portion such that the flashlight body is substantially of constant cross section and in the second position the second body portion extends outwardly from the second part of the first body portion substantially as a continuous extension thereof.

15. The invention according to claim 14 wherein the cross section of the first part is substantially rectangular.

16. The invention according to claim 11 wherein the flashlight body includes a magnet on a face thereof substantially parallel to the longitudinal axis thereof for cooperating with a portion of the housing to hold the flashlight body in place within the housing.

* * * * *